(12) United States Patent
Kamvysselis et al.

(10) Patent No.: US 6,941,429 B1
(45) Date of Patent: Sep. 6, 2005

(54) SYSTEM AND METHOD FOR IMPROVING PERFORMANCE OF A DATA BACKUP OPERATION

(75) Inventors: Peter Kamvysselis, Boston, MA (US); Peter Lacey, Nashua, NH (US); Emir Barucija-Hodzic, Princeton, NH (US)

(73) Assignee: EMC Corporation, Hopkinton, MA (US)

( * ) Notice: Subject to any disclaimer, the term of this patent is extended or adjusted under 35 U.S.C. 154(b) by 278 days.

(21) Appl. No.: 10/179,753

(22) Filed: Jun. 25, 2002

(51) Int. Cl.[7] ............................................. G06F 12/00
(52) U.S. Cl. ..................................... 711/162; 711/114
(58) Field of Search ......................... 711/114, 161, 162

(56) References Cited

U.S. PATENT DOCUMENTS

| | | | |
|---|---|---|---|
| 5,206,939 A | * | 4/1993 | Yanai et al. .................. 711/4 |
| 6,101,497 A | * | 8/2000 | Ofek .......................... 707/10 |
| 6,795,904 B1 | * | 9/2004 | Kamvysselis ................ 711/162 |

* cited by examiner

Primary Examiner—Jack A. Lane
(74) Attorney, Agent, or Firm—Robert Kevin Perkins; Leanne J. Fitzgerald; John M. Gunther

(57) ABSTRACT

A backup appliance that can be disposed on a computer adapter card mid-plane internal to a data storage system. The appliance includes logic on the computer adapter card. The logic is configured for selectively allowing either directly controlling the robot picker through the fiber channel connection or indirectly controlling the robot picker by communicating with the backup server. The logic is also configured for controlling buffering of data stored in the data storage system and communicating directly with media backup drives for writing the data from buffers in the data storage system onto the backup media drives.

8 Claims, 7 Drawing Sheets

SYSTEM AND METHOD FOR IMPROVING PERFORMANCE OF A DATA BACKUP OPERATION

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to handling of data in a data storage environment, and more particularly to a system and method for integrating a backup appliance into a data storage system.

BACKGROUND OF THE INVENTION

As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g. disk drives. The one or more processors perform their respective operations using the storage system. To minimize the chance of data loss, the computer systems also can include a backup storage system in communication with the primary processor and the data storage system. Often the connection between the one or more processors and the backup storage system is through a network in which case the processor is sometimes referred to as a "backup client."

The backup storage system can include a backup storage device (such as tape storage or any other storage mechanism), together with a system for placing data into the storage device and recovering the data from that storage device. To perform a backup, the client copies data from the shared storage system across the network to the backup storage system. Thus, an actual data file may be communicated over the network to the backup storage device.

The shared storage system corresponds to the actual physical storage. For the client to write the backup data over the network to the backup storage system, the client first converts the backup data into file data i.e., the client retrieves the data from the physical storage system level, and converts the data into application level format (e.g. a file) through a logical volume manager level, a file system level and the application level. When the backup storage device receives the data file, the backup storage system can take the application level data file, and convert it to its appropriate file system level format for the backup storage system. The data can then be converted through the logical volume manager level and into physical storage.

Various techniques have been used to improve the efficiency of backup storage systems, including the use of a so-called backup appliance. FIG. 1 shows one such prior art backup appliance that is available from EMC Corporation of Hopkinton, Mass. and which is known as "Fastrax." During a backup under control of a backup sever 14 interacting over channel 16 to host computer 12 which may communicate with a data storage system 20 through channel 18 and host channel adapter HA 22, the stored production data stored on storage devices 12 (one device shown represents many for simplicity) moves along path 21. It moves through a remote adapter RA 23, across the Fibre Channel link 32 using a communications protocol and into the data mover computer 37 that is part of backup appliance 30.

The data is then buffered and received from memory 36 along paths 33 and 34 or back to the internal Data Storage System such as the devices 26 and copied out to tape drives 40 in approximate 100 MB segments along path 39 in direction 5. If the data is coming from the Host Data Storage System faster than it can be written to tape, the data is buffered on the internal storage 26, otherwise the data is buffered in memory 36. A library robot 50 including a picker arm 51 moves media tapes in accordance with needs and under control of the backup server 14 indirectly or directly along optional path 52.

The above-described system has many advantages including speed and efficiency but is economically disadvantageous because an external cabinet and much circuit board are needed in order to house the backup appliance. It would be an advancement in the art having a cost advantage if such components could be eliminated but data mover computers are typically large and adding such to existing data storage system cabinets would increase their footprint which is typically objectionable. Therefore there is a long-felt need to balance such competing design goals while reducing costs of systems capable of performing the work of such systems as the one shown in FIG. 1.

SUMMARY OF THE INVENTION

To overcome the problems and disadvantages of the prior art and provide the advantages needed as discussed above, the present invention is a system and method for integrating a backup appliance with a data storage system.

In an embodiment of the invention, the integrated backup appliance is included on a computer adapter card in a data storage system.

In another embodiment, program code is configured for carrying out operations of the integrated backup appliance in a novel and useful way.

In another embodiment, the integrated backup appliance is configured for communicating directly with many data storage systems.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENT

Figure 1:
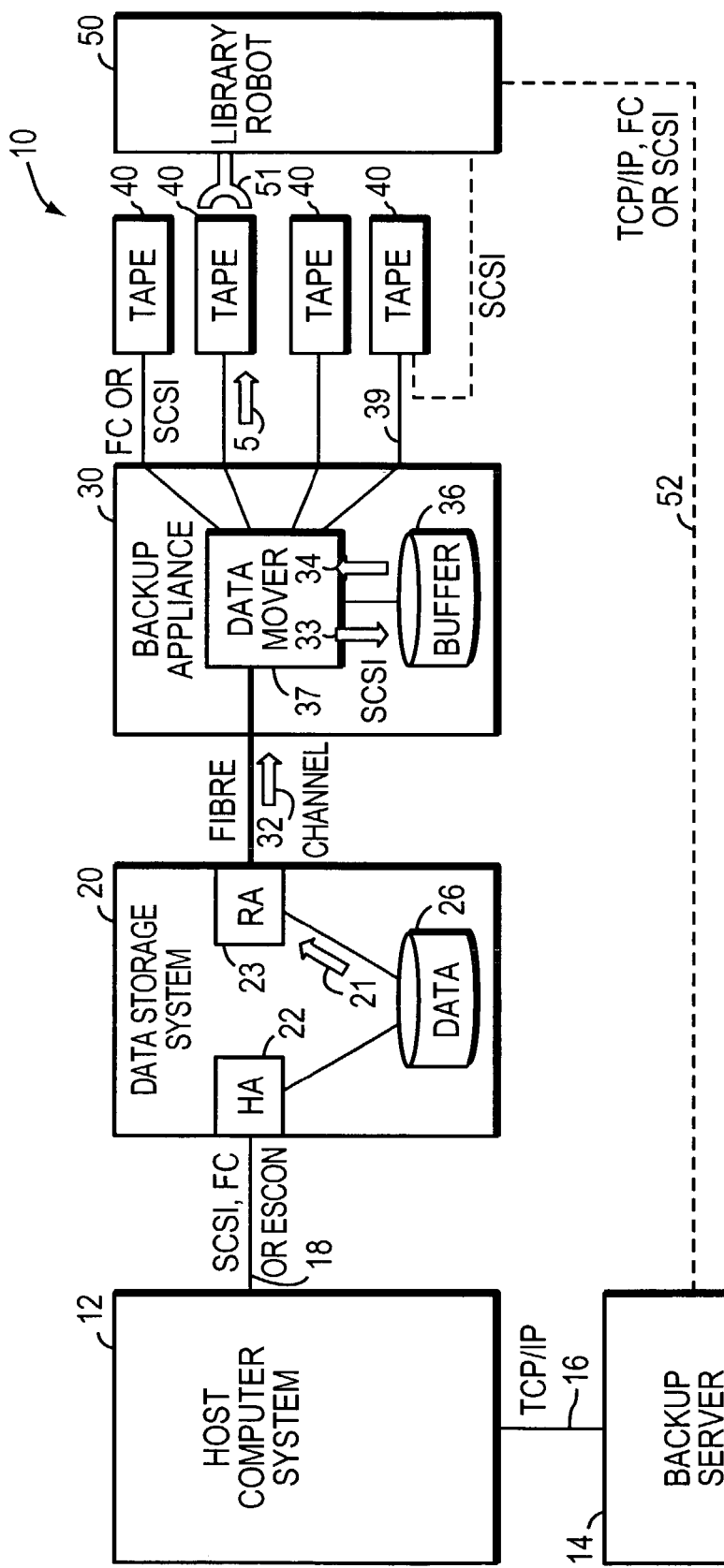
FIG. 1 is a block diagram of a prior art data storage system that cooperates with a backup appliance that further cooperates with a backup storage system.

The method, apparatus, and system of the present invention are each intended for use with data storage systems, such as the Symmetrix Integrated Cached Disk Array system available from EMC Corporation of Hopkinton, Mass., but are not limited to such a system.

The method, system, and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The program code or logic or software for carrying out the method is embodied as part of the system described below with reference to the Drawing Figures.

The invention is useful in an environment wherein data is normally backed up to a backup storage system including a library unit, which may have tapes or disks for storing data thereon.

Figure 2:
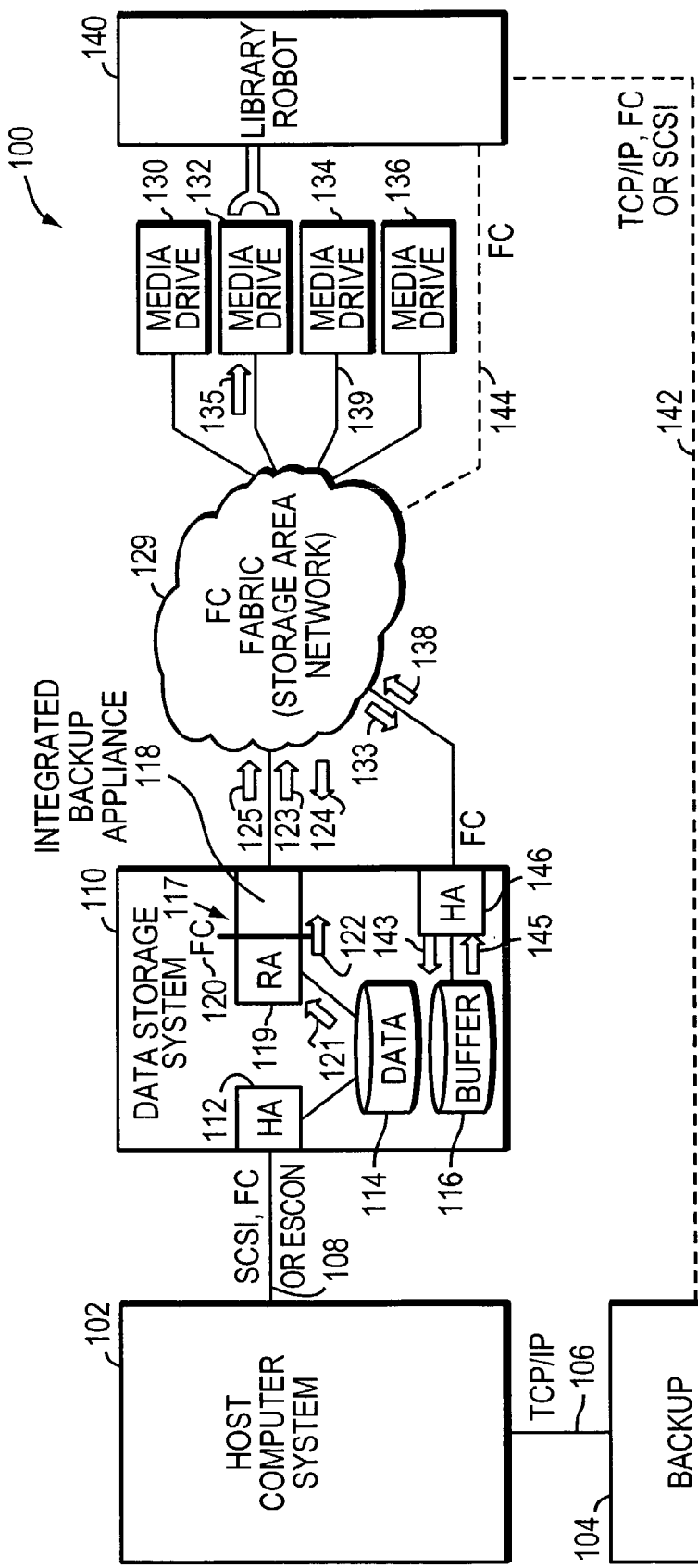
FIG. 2 is a block diagram showing an embodiment of this invention including a data storage system having a novel integrated backup appliance that communicates with a backup storage system for carrying out backup operations.

Referring now to FIG. 2, reference is now made to a data storage network 100 in which the invention is particularly useful and includes a Data Storage System 110, host Computer System 102, Backup Server 104, and Media Library Robot 140 serving Media Drives 130–136. Such Media may include disks or tapes or other type of media including such a type not currently known for backup. The Data Storage System 110 and Host Computer 102 communicate over channel 108, which may be SCSI, Fibre Channel (FC), or ESCON, through host adapter 112. The Host further communicates with the Backup Server through line 106 in accordance, preferably, with the known TCP/IP protocol.

In a preferred embodiment the data storage system is a Symmetrix Integrated Cached Disk Arrays available from EMC Corporation of Hopkinton, Mass. Such a data storage system and its implementation is fully described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems.

Referring to FIG. 2, in this configuration an integrated backup appliance 118 in the preferred configuration of a computer adapter card also known as a compute adapter card 117 replaces the data mover and other components of the backup appliance of the prior art (e.g. that shown in FIG. 1). The connection from the production host 102 is similar to prior art configurations but the preferred Fibre Channel connection 120 from a remote adapter RA 119 is across a mid-plane 120 internal to the data storage system, preferably through a fiber optic cable in path 122. The compute adapter 117 then connects to the media drives 130–136 and to the front end of the Symmetrix through a fiber optic Fibre Channel port (preferably through a switch). In this configuration, there is no need for a separate cabinet for the backup appliance or a separate data mover computer. The robot 140 may be controlled directly by the backup server 104, or through a Fibre Channel connection through fibre channel fabric 129 or network cloud (i.e., a storage area network) from the compute adapter 117, with communication respectively along paths 139, 144, and 142 in directions 124–125, 123, and 135.

During a backup, the production data stored on devices 114 moves through the RA 119 and across the Fibre Channel mid-plane, preferably using the known RDF protocol in the preferred Symmetrix system. When the data is received by the backup appliance program logic or code (See more detail with reference to FIG. 5, below) running in the compute adapter, it is still buffered in memory 116 into segments to be written to backup media 130-136 through the Fibre Channel fabric 129. When data needs to be buffered to disk, the backup appliance uses its midplane connection to the buffer memory. Communication may also be made to and from the buffer from the FC fabric through host adapter 146 along paths 143 and 145, respectively.

Figure 3:
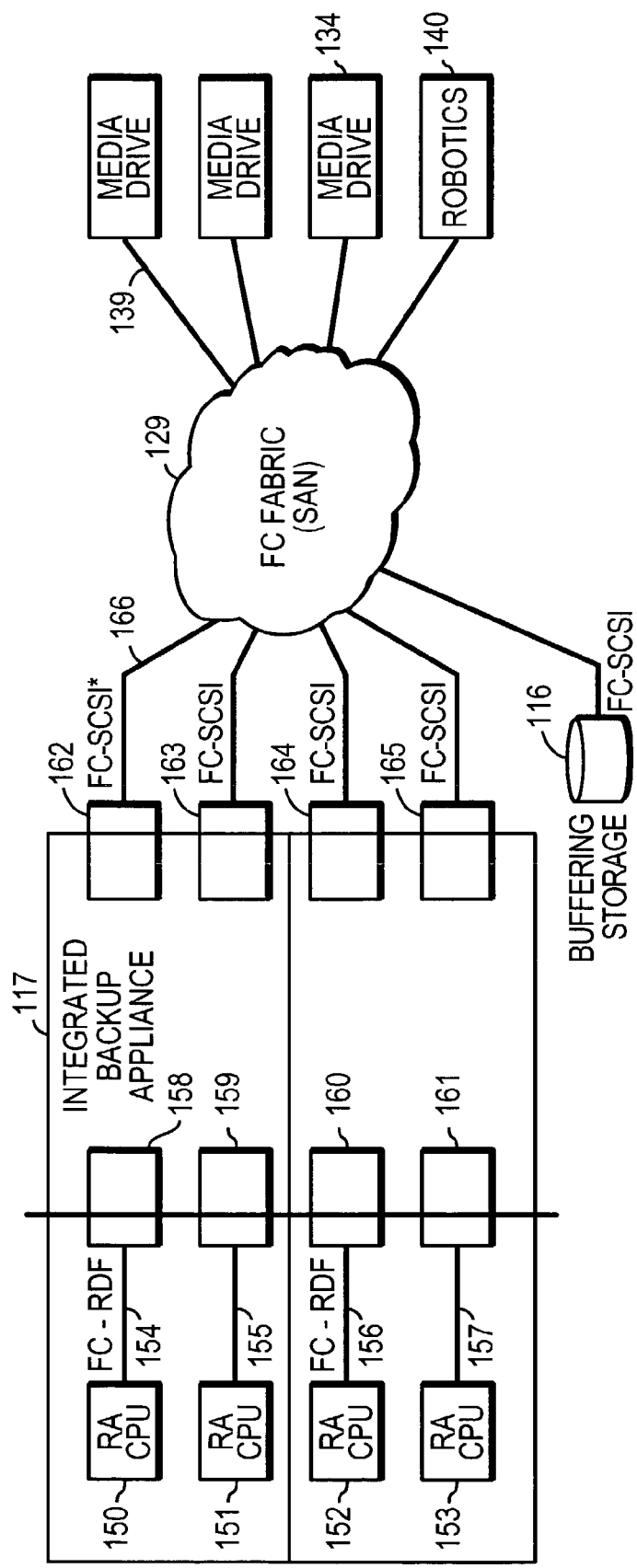
FIG. 3 is a schematic representation of the integrated backup appliance and cooperating members of the data storage system of FIG. 2.

Referring now to FIG. 3, a more detailed view of the integrated backup appliance and its relationship with other members of the data storage system is shown. Remote Adapter CPU's 150–153 communicate in accordance with the preferred RDF protocol for Fibre Channel (FC) over lines 154–157 on adapter 117 to Fibre Directors 158–161 and to FC-SCSI interface adapters 162–165 along paths 166 to fabric 129 over lines 139 to the media drives, e.g. drive 134 and with one variation of communicating with buffering storage 116.

Figure 4:
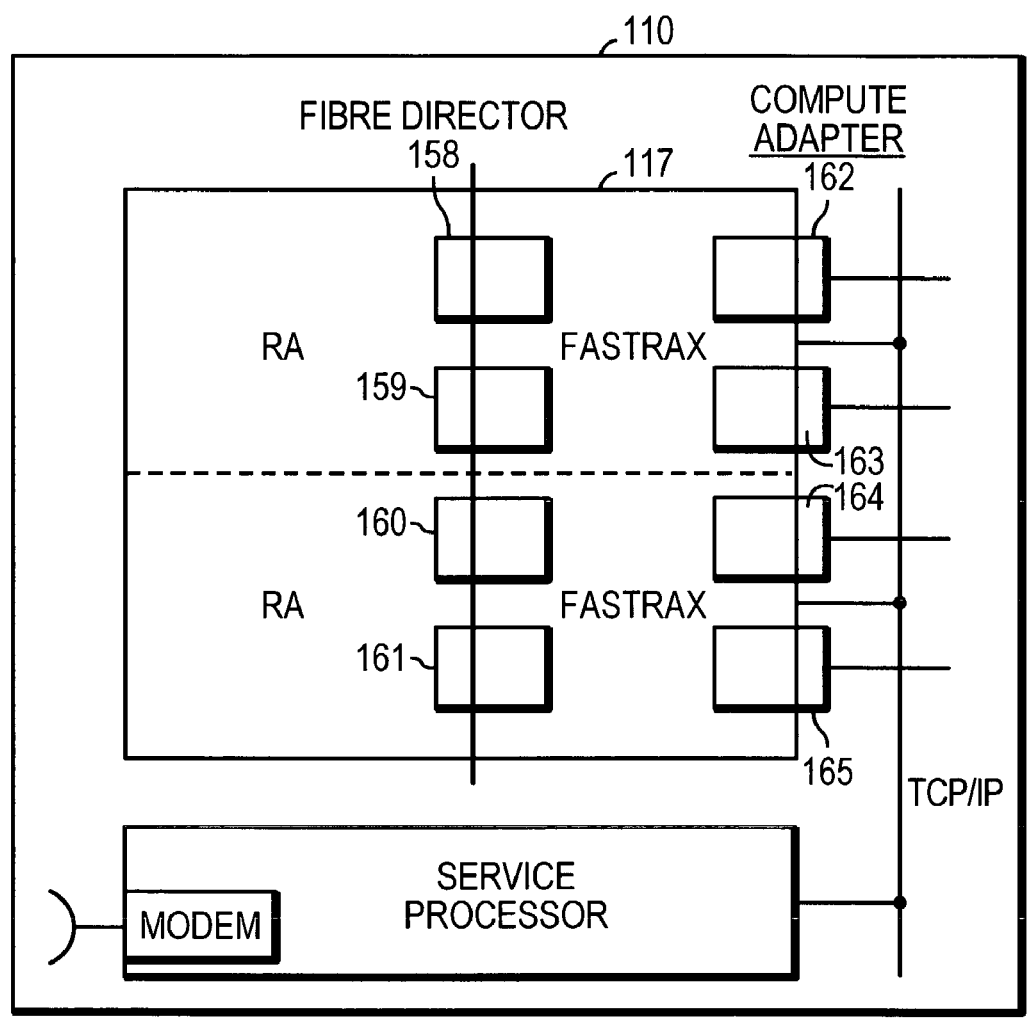
FIG. 4 is another schematic representation of the integrated backup appliance and cooperating members of the data storage system of FIG. 2.
Figure 5:
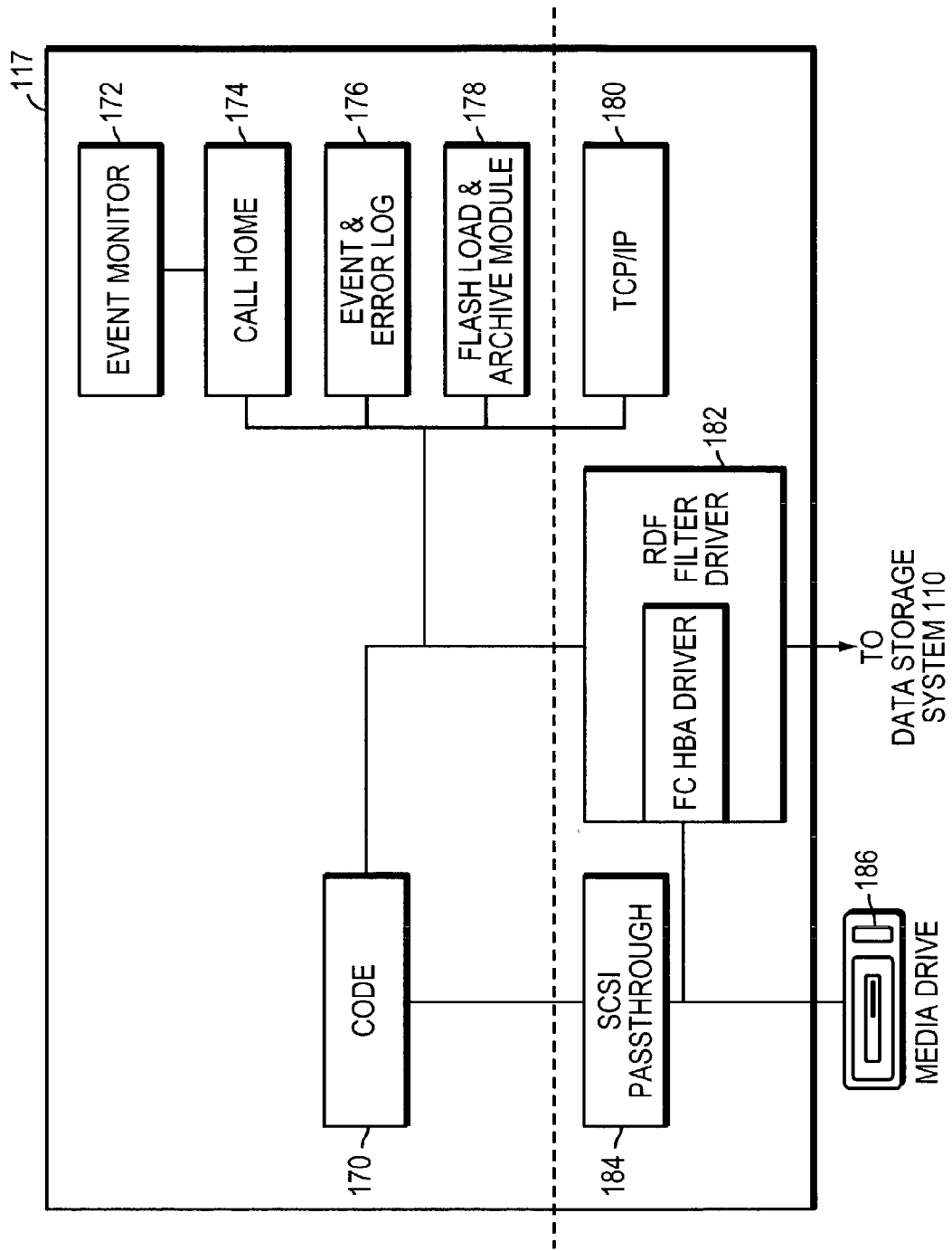
FIG. 5 is a block diagram of the functional components of the integrated backup appliance program logic or software.

Referring now to FIG. 4, the data storage system 110 includes the compute adapter 117 with the components discussed above that communicate in the preferred TCP/IP protocol to a service processor which may be a known laptop computer to enable the program code function shown in FIG. 5. Preferably an ethernet segment running TCP/IP may connect the service processor to each the computer adapter for such function as dial in and call home access that may be needed for service and maintenance.

Referring now to FIG. 5, a block diagram of the functional components of the integrated backup appliance program logic or software is shown. For configuration and management, control code 170 communicates with SCSI passthrough logic for communicating directly with a media drive 186. An event monitor module 172 and call home module 174 will communicate directly with the service processor through TCP/IP module 180 for service and maintenance. Further diagnostics, may be available through an event and error log module 176. Flash load through module 178 will allow for flash memory booting or installation of an image if needed for service or for installing new program code, and some archive of such images is also done via this module.

Figure 8:
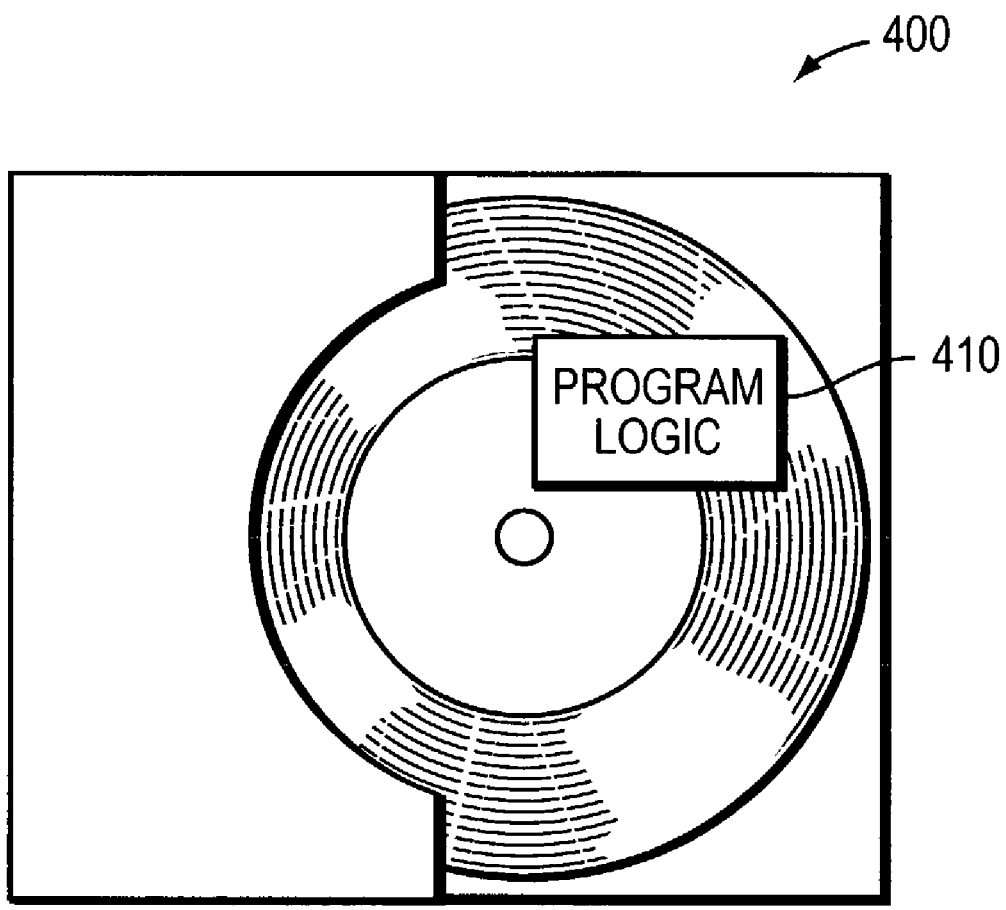
FIG. 8 is an illustration of an embodiment of program code on a tangible medium for carrying out operation of the invention.

Reference is made to FIGS. 5 and 8 below. An FC Host Bus Adapter (HBA) and RDF Filter Driver allow communication directly to the data storage system or the drive units in a library. This filter driver allows RDF protocol access to the extended functionality for the FC HBA driver and allows the RDF driver to access the Fibre Channel protocol directly without using a SCSI layer. Any or all of the program code may be embodied on a tangible medium 440 as program logic 410 for carrying out operation of the invention (FIG. 8).

Figure 6:
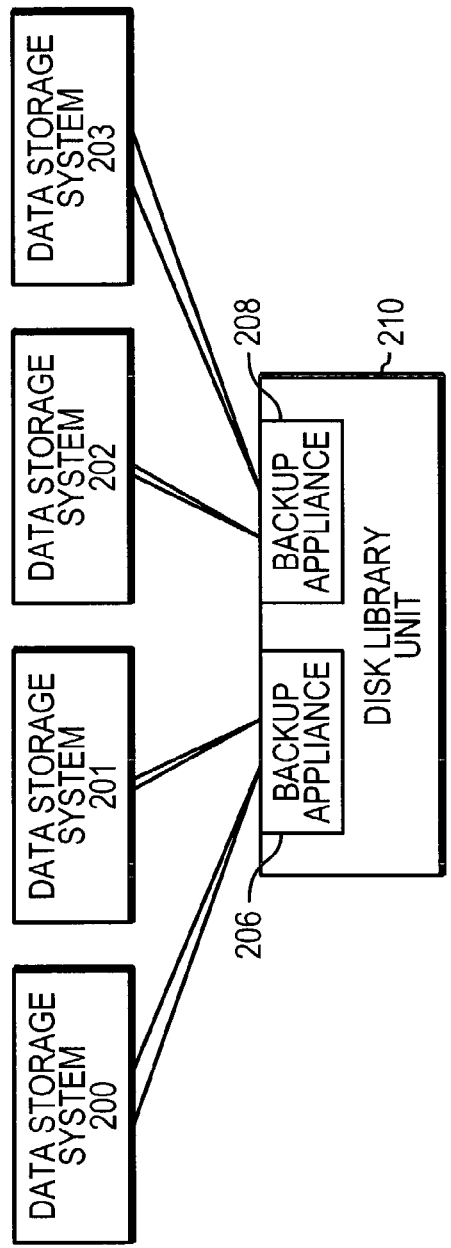
FIG. 6 is a schematic block diagram of an embodiment of the invention including a use of an integrated backup appliance with more than one data storage system and a disk library unit.
Figure 7:
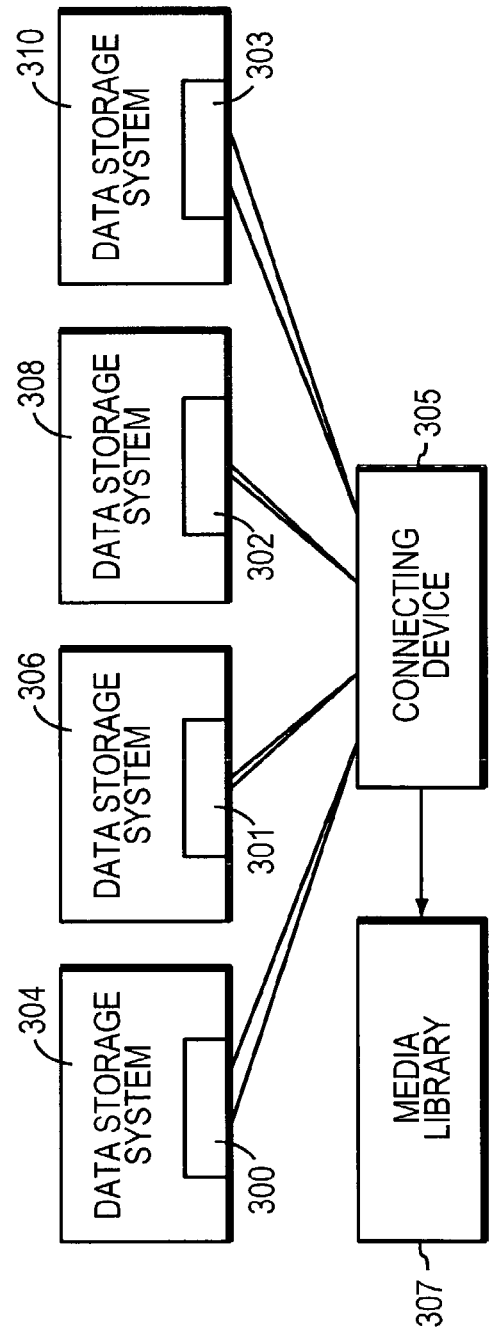
FIG. 7 is another schematic block diagram of an embodiment of the invention including a use of an integrated backup appliance with a connecting device and a media library.

Reference is made now to FIGS. 6 and 7. Referring to FIG. 6, a schematic block diagram of an embodiment of the invention including a use of one more integrated backup appliances 206 and 208 configured as backup appliance 117 with more than one data storage system 200–203 and a disk library unit 210. FIG. 7 shows another schematic block diagram of an embodiment of the invention including a use of integrated backup appliances 300–303 configured like backup appliance 117 with a connecting device 305 such as a switch and a media library 307 include drives and a robot (not shown).

A system and method has been described for managing data that may be replicated across one or more computer systems. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents including those that are not currently foreseeable.

What is claimed is:

1. In a data storage environment including a backup server and a robot picker for servicing backup media, a backup appliance for backup of data stored on a data storage system to backup media, the backup appliance comprising:

a computer adapter card disposed on a mid-plane internal to the data storage system and including logic on the computer adapter card configured for (i) selectively allowing either directly controlling the robot picker through the fibre channel connection or indirectly controlling the robot picker by communicating with the backup server (ii) controlling buffering of data stored in the data storage system and (iii) communicating directly with media backup drives for writing the data from buffers in the data storage system onto the backup media drives.

2. The appliance of claim 1, wherein the selectivity is achieved by using a switch in cooperation with the connection.

3. The appliance of claim 1, wherein the connection is a fibre channel connection.

4. The appliance of claim 3, wherein the selectivity is achieved by using a switch in cooperation with the fiber channel connection.

5. In a data storage environment including a backup server and a robot picker for servicing backup media, a method of backing up data stored on a data storage system to backup media, the method comprising:

disposing a backup appliance on a mid-plane internal to the data storage system; and including logic on the backup appliance that (i) selectively allows either directly controlling the robot picker through a connection or indirectly controlling the robot picker by communicating with the backup server (ii) controlling buffering of data stored in the data storage system and (iii) communicating directly with media backup drives for writing the data from buffers in the data storage system onto the backup media drives.

6. The method of claim 5, wherein the selectivity is achieved by using a switch in cooperation with the connection.

7. The method of claim 5, wherein the connection is a fibre channel connection.

8. The method of claim 7, wherein the selectivity is achieved by using a switch in cooperation with the fibre channel connection.

* * * * *